United States Patent
Nakagawa et al.

(10) Patent No.: US 12,421,077 B2
(45) Date of Patent: Sep. 23, 2025

(54) WIRELESS POWER SUPPLY SYSTEM FOR ELEVATORS AND ELEVATOR SYSTEM

(71) Applicant: Mitsubishi Electric Corporation, Tokyo (JP)

(72) Inventors: Mariko Nakagawa, Tokyo (JP); Tomokazu Sakashita, Tokyo (JP); Miyuki Takeshita, Tokyo (JP); Hidehito Yoshida, Tokyo (JP); Hirohisa Kuwano, Tokyo (JP); Takuya Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 952 days.

(21) Appl. No.: 17/619,251

(22) PCT Filed: Jul. 19, 2019

(86) PCT No.: PCT/JP2019/028385
§ 371 (c)(1),
(2) Date: Dec. 15, 2021

(87) PCT Pub. No.: WO2021/014480
PCT Pub. Date: Jan. 28, 2021

(65) Prior Publication Data
US 2022/0259008 A1  Aug. 18, 2022

(51) Int. Cl.
*B66B 1/00* (2006.01)
*B66B 1/34* (2006.01)
(Continued)

(52) U.S. Cl.
CPC .............. *B66B 1/34* (2013.01); *H02J 7/0013* (2013.01); *H02J 7/00308* (2020.01);
(Continued)

(58) Field of Classification Search
CPC .. B66B 1/34; B66B 7/00; H02J 7/0013; H02J 7/00308; H02J 7/0049; H02J 7/00712; H02J 50/10; H02J 50/402
See application file for complete search history.

(56) References Cited

U.S. PATENT DOCUMENTS

2002/0112924 A1* 8/2002 Mori ................... B66B 11/0055
187/290

FOREIGN PATENT DOCUMENTS

JP 2002-249285 AA 9/2002
JP 2006-8394 A 1/2006
(Continued)

OTHER PUBLICATIONS

International Search Report and Written Opinion mailed on Sep. 10, 2019, received for PCT Application PCT/JP2019/028385, Filed on Jul. 19, 2019, 10 pages including English Translation.
(Continued)

*Primary Examiner* — Julio C. Gonzalez
(74) *Attorney, Agent, or Firm* — XSENSUS LLP

(57) ABSTRACT

A wireless power supply system for elevators includes a power transmitting device, first and second power receiving devices provided in the first and second elevator cars respectively, and a control device. The power transmitting device includes power transmitting units each having an inverter and two power transmitter coils. The first power receiving device includes first power receiving units each having a rectifier circuit and a power receiver coil that can be coupled with one of the two power transmitter coils. The second power receiving device includes second power receiving units each having a rectifier circuit and a power receiver coil that can be coupled with the other of the two power transmitter coils. The power transmitting device, or the first and second power receiving devices include switches to disconnect the inverter and the first load device as well as the inverter and the second load device.

20 Claims, 7 Drawing Sheets

(51) Int. Cl.
*H02J 7/00* (2006.01)
*H02J 50/10* (2016.01)
*H02J 50/40* (2016.01)

(52) U.S. Cl.
CPC ........ *H02J 7/0049* (2020.01); *H02J 7/00712* (2020.01); *H02J 50/10* (2016.02); *H02J 50/402* (2020.01)

(56) References Cited

FOREIGN PATENT DOCUMENTS

| | | |
|---|---|---|
| JP | 2012-246119 A | 12/2012 |
| JP | 2013-47137 A | 3/2013 |
| JP | 2015-82963 A | 4/2015 |
| JP | 2017-51074 A | 3/2017 |
| JP | 6187384 B2 | 8/2017 |
| JP | 2017-175704 A | 9/2017 |
| JP | 2017-186145 A | 10/2017 |
| JP | 2018-20877 A | 2/2018 |
| JP | 2019-6521 A | 1/2019 |
| WO | 2018/025535 A | 2/2018 |

OTHER PUBLICATIONS

Chinese Office Action issued Aug. 29, 2022 in corresponding Chinese Patent Application No. 201980098428.5.
Office Action issued May 13, 2023 in Chinese Patent Application No. 201980098428.5 and computer-generated English translation thereof 13 pages.
Office Action issued on Mar. 2, 2023, in corresponding Chinese patent Application No. 201980098428.5, 15 pages.

\* cited by examiner

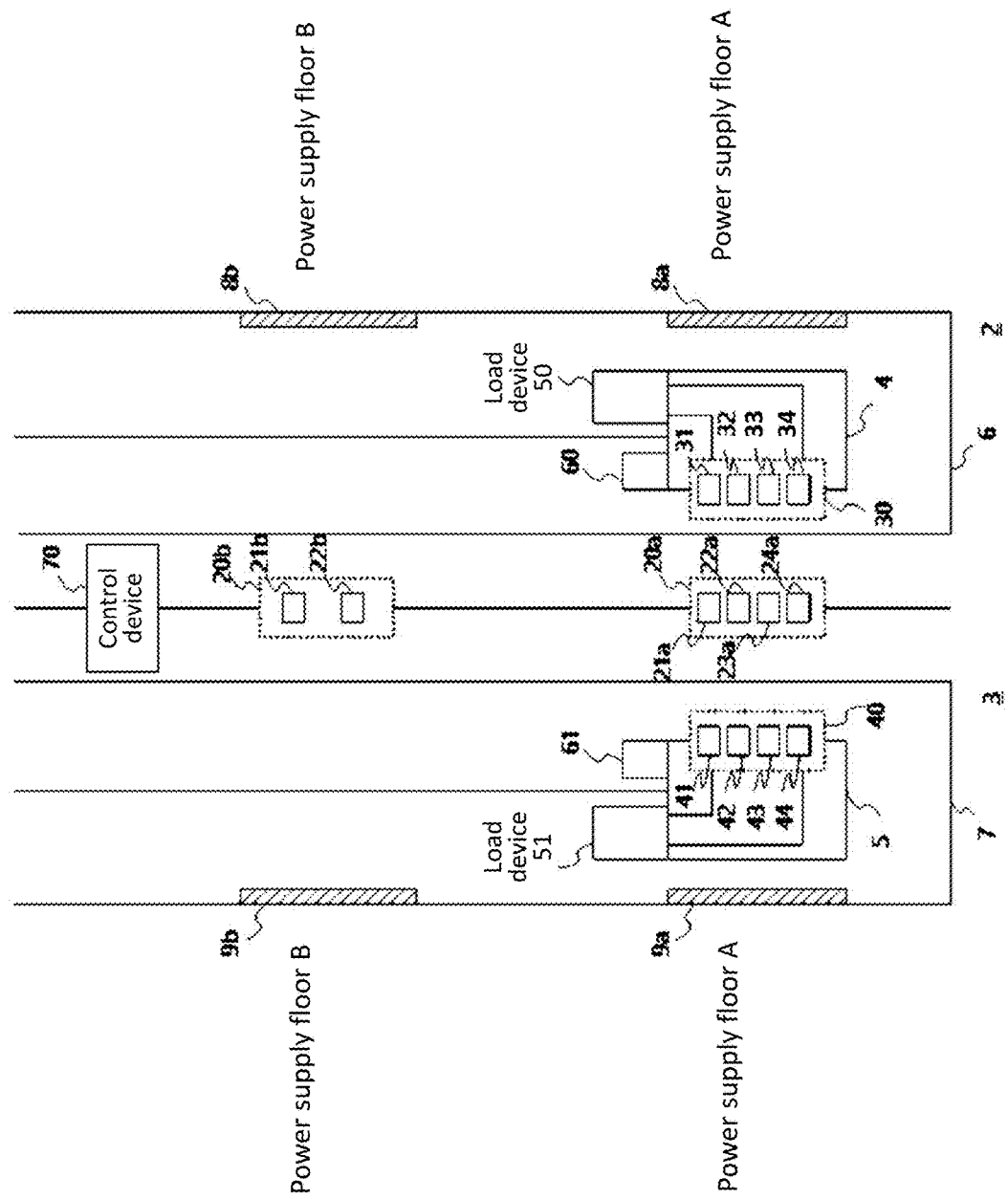

WIRELESS POWER SUPPLY SYSTEM FOR ELEVATORS AND ELEVATOR SYSTEM

CROSS-REFERENCE TO RELATED APPLICATION

The present application is based on PCT filing PCT/JP2019/028385, filed Jul. 19, 2019 the entire contents of which are incorporated herein by reference.

TECHNICAL FIELD

The present disclosure relates to a wireless power supply system for elevators that supplies power to loads in a non-contact manner and an elevator system that uses the wireless power supply system for elevators.

BACKGROUND TECHNOLOGY

In recent years, interest in wireless power supply technology has increased, and its use in various fields is being considered. For example, in elevator systems, introduction of wireless power supply technology aimed at eliminating cables that supply power to elevator cars is being considered. As such elevator systems, there is a wireless power supply system for elevators in which loads or batteries each connected in series to their respective power receiving devices of two elevator cars, which are installed across a wall, are simultaneously charged with power by one power transmitting device (see Patent Document 1).

PRIOR ART LITERATURE

Patent Documents

[Patent Document 1]
Japanese Unexamined Patent Publication No. 2013-47137

SUMMARY OF INVENTION

Problems to be Solved by the Invention

However, in a conventional wireless power supply system shown in Patent Document 1, since there is only one power transmitter coil, power transfer is difficult to be performed in accordance with the load states such as power consumption or remaining battery level, the loads being installed in the two elevator cars. For example, in a case where the power transmitting device charges power to an elevator car that needs to move to its next destination floor in a short time and an elevator car that is allowed to be stopped for a long time at the same time, priority of the power transfer cannot be given to the elevator car to be charged in a short time. This might degrade the operation efficiency of the elevator. In addition, when charging batteries with different remaining battery levels at the same time, there is a risk of overcharging a battery with a higher remaining battery level, which may lead to deterioration or failure of the battery.

The present invention has been made to solve the above-mentioned problems, and to obtain a wireless power supply system for elevators and an elevator system capable of adjusting the charging power in accordance with the state of a load provided in each elevator car.

Means for Solving the Problems

A wireless power supply system for elevators according to the present disclosure is a wireless power supply system for elevators that supplies power in a non-contact manner to a first elevator car and a second elevator car installed individually in two hoistways provided side by side, the wireless power supply system including: a power transmitting device to supply power; a first power receiving device provided in the first elevator car, to receive power supplied from the power transmitting device and supply the power to a first load device; a second power receiving device provided in the second elevator car, to receive power supplied from the power transmitting device and supply the power to a second load device; and a control device to control at least one of the power transmitting device, the first power receiving device, and the second power receiving device, wherein the power transmitting device includes a power transmitting unit which has an inverter that supplies AC power and two power transmitter coils connected in parallel to each other to the inverter, the first power receiving device includes a first power receiving unit which has a power receiver coil that can be coupled with one of the two power transmitter coils and a rectifier circuit connected in series with the power receiver coil, the second power receiving device includes a second power receiving unit which has a power receiver coil that can be coupled with the other of the two power transmitter coils and a rectifier circuit connected in series with the power receiver coil, and the power transmitting device, or the first power receiving device and the second power receiving device include a plurality of switches to disconnect the inverter and the first load device as well as the inverter and the second load device.

Effects of the Invention

According to the wireless power supply system for elevators and the elevator system according to the present disclosure, it is possible to obtain a wireless power supply system for elevators and an elevator system that can adjust the supply power in accordance with the state of a load provided in each of a plurality of elevator cars.

BRIEF DESCRIPTIONS OF THE DRAWINGS

FIG. 7 is a configuration diagram of an elevator system according to Embodiment 4 of the present disclosure.

EMBODIMENTS FOR CARRYING OUT THE INVENTION

Embodiment 1

Figure 1:
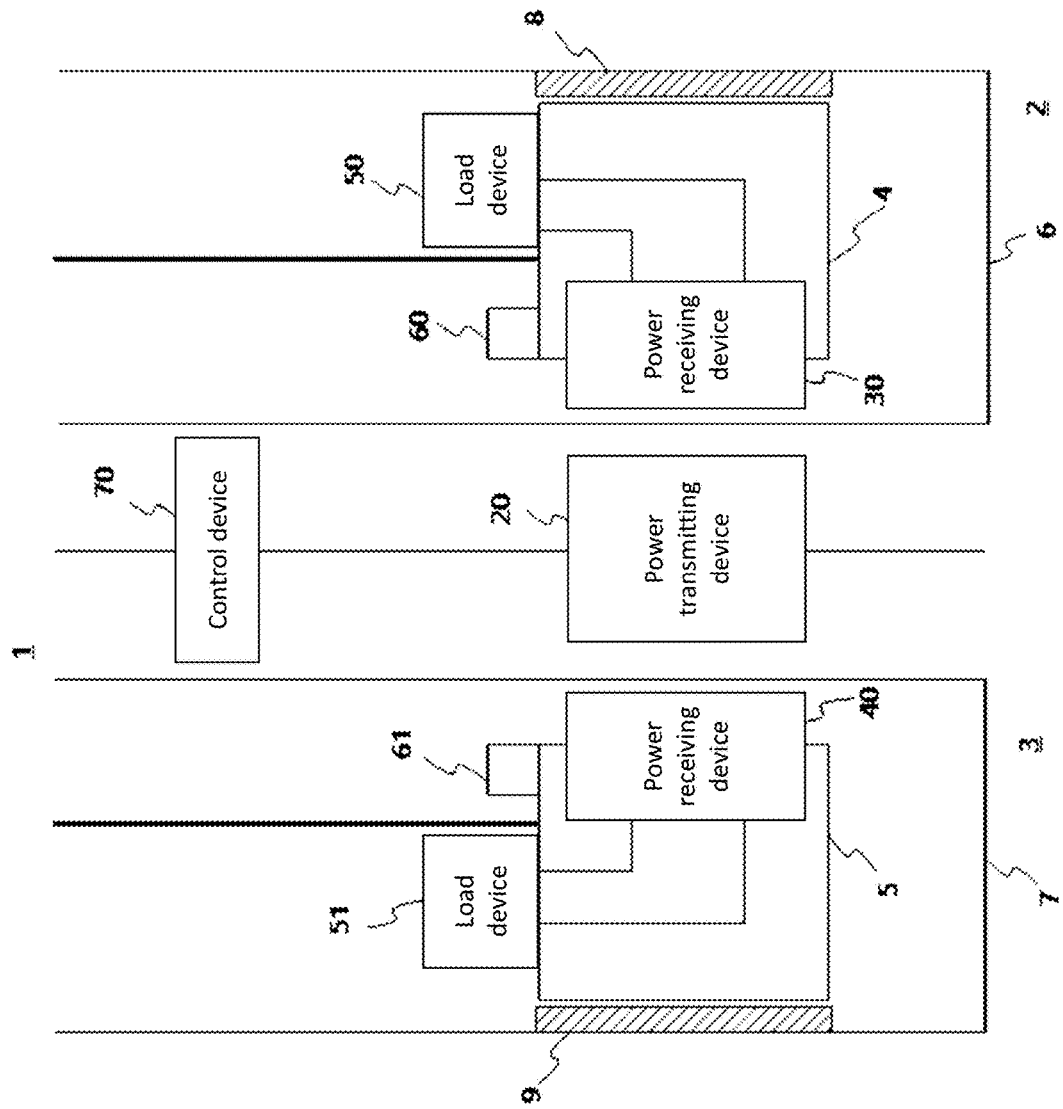
FIG. 1 is a configuration diagram of an elevator system according to Embodiment 1 of the present disclosure.
Figure 2:
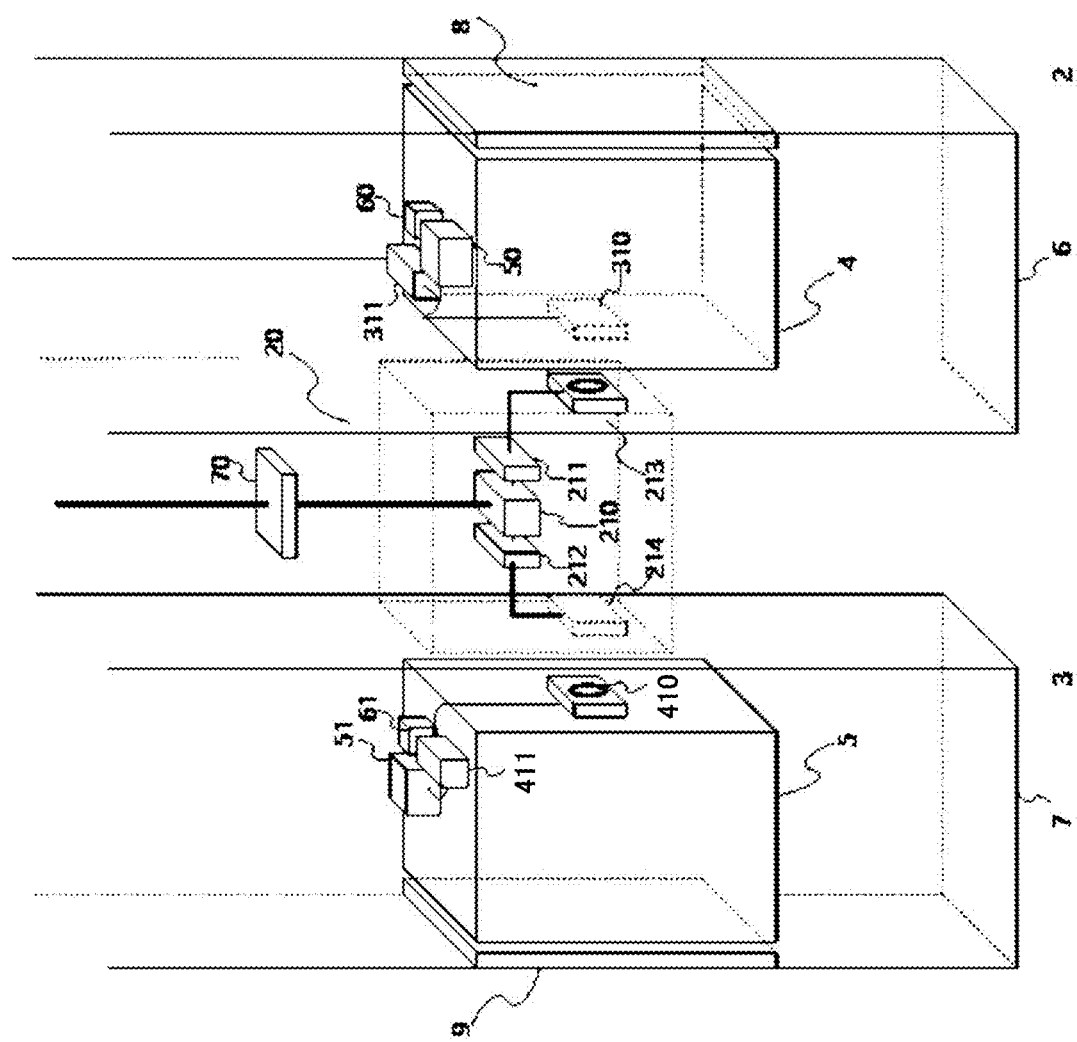
FIG. 2 is a perspective view showing a structure of the elevator system according to Embodiment 1 of the present disclosure.

A wireless power supply system for elevators and an elevator system according to Embodiment 1 of the present disclosure will be described with reference to drawings. FIGS. 1 and 2 are a configuration diagram and a perspective view, respectively, of an elevator system to which a wireless power supply system for elevators according to Embodiment 1 is applied. In the elevator system 1 shown in FIGS. 1 and 2, two elevators (a first elevator 2 and a second elevator 3) are arranged side by side with a wall in between. Then, at the wall between the two elevators, a power transmitting device 20 and a control device 70 are provided. The power transmitting device 20, which is connected to an AC power supply or a DC power supply (not shown; hereinafter referred to as "main power source 10"), transmits the power supplied from the main power source 10 to the elevator cars. The control device 70 controls the power transmitting device 20. The power transmitting device 20 is installed at a place where it can supply an elevator car with power when the elevator car stops at a stopping floor.

The first elevator 2 includes a first hoistway 6, a first elevator car 4 that moves in the first hoistway 6, and first entrance/exit doors 8. The first elevator car 4 is equipped with a first power receiving device 30 that receives power transmitted from the power transmitting device 20, a first load device 50 connected to output terminals of the first power receiving device 30, and a first load detector circuit 60 to detect a state of the first load device 50. Here, the first entrance/exit doors 8 are entrance/exit doors provided on a stopping floor, among a plurality of stopping floors provided to the first hoistway 6, where the power transmitting device 20 is installed to be able to charge the first load device 50 when the first elevator car 4 is stopped. Hereinafter, a stopping floor on which the power transmitting device 20 is installed may be referred to as a power supply floor. There may be one power supply floor or a plurality of power supply floors in the elevator system.

The second elevator 3 has the same configuration as the first elevator 2, and includes a second elevator 7, a second elevator car 5 that moves in the second elevator 7, and second entrance/exit doors 9. Also, the second elevator car 5 is equipped with a second power receiving device 40 that receives power transmitted from the power transmitting device 20, a second load device 51 connected in series to output terminals of the second power receiving device 40, and a second load detector circuit 61 to detect a state of the second load device 51.

Figure 3:
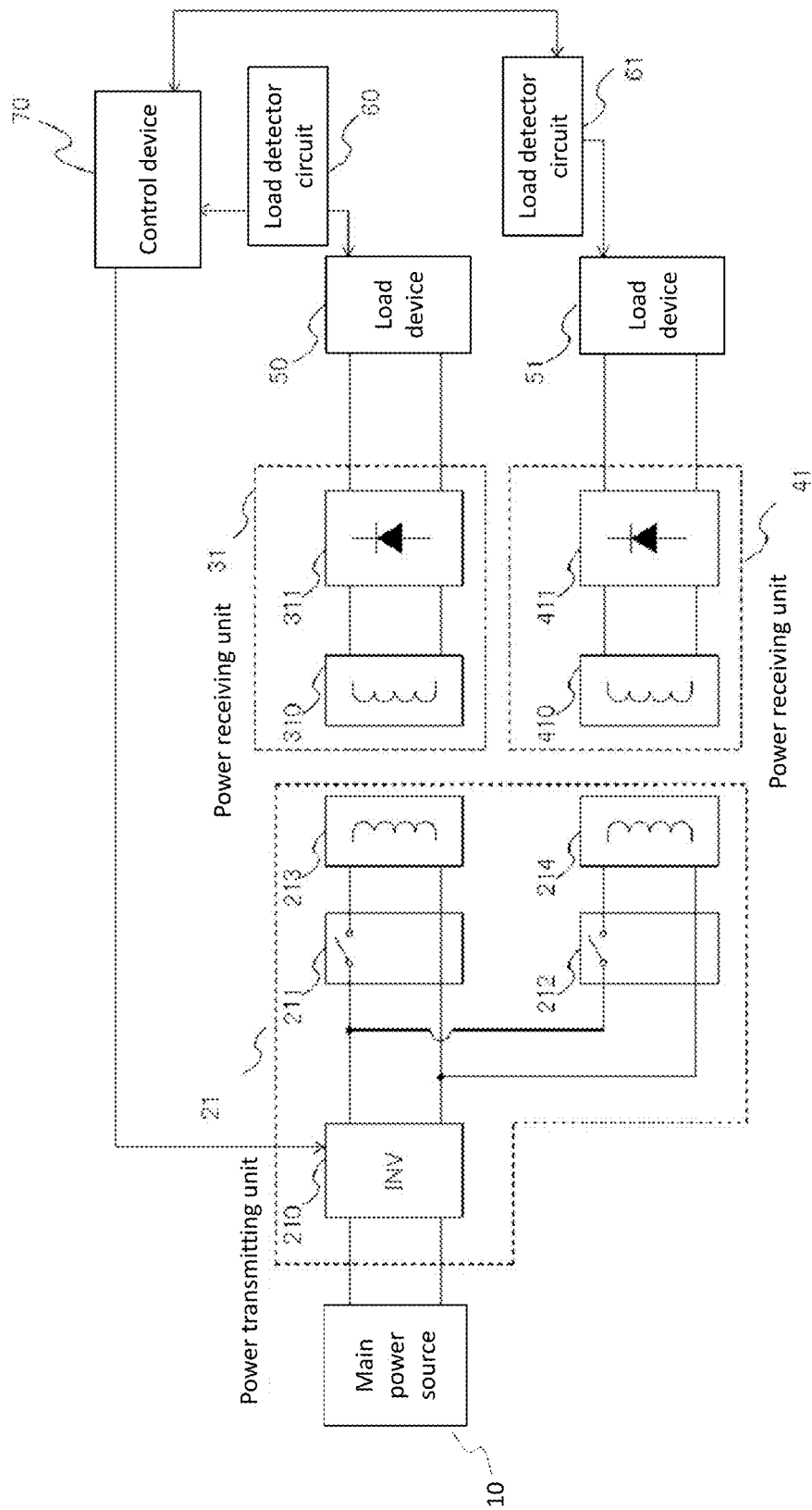
FIG. 3 is a circuit block diagram of the wireless power supply system according to Embodiment 1 of the present disclosure.

FIG. 3 shows a circuit block diagram of the wireless power supply system for elevators according to Embodiment 1. In FIG. 3, the wireless power supply system for elevators is a power supply system that is connected to the main power source 10, the first load device 50, and the second load device 51, and supplies power inputted from the main power source 10 to the first load device 50 and the second load device 51. The wireless power supply system for elevators includes: a power transmitting unit 21 installed in the power transmitting device 20; a power receiving unit (a first power receiving unit) 31 installed in the first power receiving device 30; a power receiving unit (a second power receiving unit) 41 installed in the second power receiving device 40; a first load detector circuit 60 to detect a load state of the first load device 50; a second load detector circuit 61 to detect a load state of the second load device 51; and a control device 70 to control the power transmitting device 20.

In the wireless power supply system for elevators according to the present embodiment, power is transmitted from the power transmitting device 20 and received by the first power receiving device 30 and the second power receiving device 40 by a wireless power supply method. The wireless power supply method described in the present embodiment is an electromagnetic induction method, but this is not a limitation; any method such as an electromagnetic field resonance method or a microwave power transmission method may be used. Further, although the case where the main power source 10 is a DC power supply is described here, the main power source 10 may be an AC power supply. In that case, an AC/DC converter may be provided between the main power source 10 and the power transmitting unit described below.

In the wireless power supply system for elevators according to the present embodiment, the power transmitting device 20 includes one power transmitting unit 21. The power transmitting unit 21 includes: an inverter 210 that converts DC power inputted from the main power source 10 into AC power and outputs it, a first switch 211 and a second switch 212 connected to output terminals (AC side terminals) of the inverter 210; a first power transmitter coil 213 connected in series to the first switch 211; and a second power transmitter coil 214 connected in series to the second switch 212. The first switch 211 and the second switch 212 are connected in parallel to each other, and the first power transmitter coil 213 and the second power transmitter coil 214 are connected in parallel to each other.

The first power receiving device 30 includes one power receiving unit 31. The power receiving unit 31 is equipped with a first power receiver coil 310, which can be magnetically coupled with the first power transmitter coil 213 when the first elevator car 4 stops at a power supply floor, and a first rectifier circuit 311 that is connected to the first power receiver coil 310 and rectifies AC power inputted from the first power receiver coil 310. In addition, the first load device 50 is connected to the first rectifier circuit 311.

The second power receiving device 40 includes one power receiving unit 41. The power receiving unit 41, having the same configuration as the first power receiving device 30, is equipped with a second power receiver coil 410, which can be magnetically coupled with the second power transmitter coil 214 when the second elevator car 5 stops at a power supply floor, and a second rectifier circuit 411 that is connected in series to the second power receiver coil 410 and rectifies AC power inputted from the second power receiver coil 410. The second load device 51 is connected to the second rectifier circuit 411. Here, the performances of the power receiving unit 31 and the power receiving unit 41 may be the same or different.

The first load device 50 and the second load device 51 are, for example, a lighting device, an air conditioning device, and a battery that are installed in an elevator car, but not limited to these, needless to say. In the present embodiment and the embodiments described below, it is assumed that the first load device 50 and the second load device 51 are batteries. In the following description, when the first load device 50 and the second load device 51 are collectively referred to, or when they are not distinguished from each other, they are simply referred to as the load devices.

The first load detector circuit 60 and the second load detector circuit 61 are detector circuits which detect load states of the first load device 50 and the second load device 51, respectively. If a load device is a battery, a battery voltage and a remaining battery level, for example, are detected. If a load device is a lighting device, an air conditioning device, etc. in the elevator car, the power consumption thereof, for example, is detected. The first load detector circuit 60 and the second load detector circuit 61 output detection results to the control device 70. Here, the method of outputting the detection results to the control device 70 is not specifically limited; wired communication using a separately provided cable, etc. or wireless communication may be adopted. When the first load detector circuit 60 and the second load detector circuit 61 are collectively described or not distinguished from each other in the following description, they are simply referred to as the load detector circuits.

The control device 70 is a control device that controls the power transmitting device 20 in accordance with the states of the load devices. More specifically, on the basis of the detection results of the first load detector circuit 60 and the second load detector circuit 61, the control device 70 sends a decision signal which determines the start/stop of power supply to the respective load devices, to the first switch 211 or the second switch 212 of the power transmitting device. As described below, when the first switch 211 and the second switch 212 are provided on the side of their respective power receiving devices, the control device 70 controls the first power receiving device 30 and the second power receiving device 40 in addition to the power transmitting device 20. In addition, the control device 70 has functions to determine, on the basis of the detection results of the load detector circuits, the amounts of power supply to their respective load devices (amounts of charge if the loads are batteries) and to adjust the output power of the inverter. Furthermore, the control device 70 performs overall control to raise and lower the elevator cars, and also adjusts the output of the inverter 210 to determine whether the first and second elevator cars have stopped at positions where power can be supplied. There is no specific limitation to the method of determination performed by the control device 70. For example, the control device 70 can determine whether the first power receiver coil 310 has stopped at a position where power transfer is possible with the first power transmitter coil 213 by applying a small current from the inverter 210 to the first power transmitter coil 213 and detecting impedance change. The method is not limited to this, and the stop position of a power receiver coil may be detected by detecting the winding length of a hoisting machine or by using a position detection function provided in the existing system.

In Embodiment 1, the installation positions of the switches, the power transmitter coils, and the power receiver coils are not limited to those shown in FIG. 3, but they can be placed at any position as long as each of them can perform the same function and achieve the same effect. For example, in the wireless power supply system for elevators shown in FIG. 3, the first switch 211 is located between the inverter 210 and the first power transmitter coil 213; the second switch 212 is located between the inverter 210 and the second power transmitter coil 214. However, the positions of the switches are not limited to these, and each switch may be placed at any position, such as between a power receiver coil and a rectifier circuit, as long as they can disconnect the inverter 210 and the load devices.

Next, the operation of the wireless power supply system for elevators and the elevator system according to the present embodiment will be described. First, a case where power is supplied to one elevator car will be described.
(A) Power Supply to One Elevator Car Here, the case where only the first elevator car 4 stops at a power supply floor and only the first elevator car 4 is supplied with power will be described.

The control device 70 adjusts the output of the inverter 210 to apply a small current to the first power transmitter coil 213 and measures the impedance of the load device side when viewed from output terminals of the inverter 210. The method of measuring impedance is a known technique, and any method may be used. On the basis of the measured impedance, it is determined whether the first power receiver coil 310 has stopped at a position where power transfer with the first power transmitter coil 213 is possible. Any method may be used for the determination. For example, by storing in advance the impedance value when the power transmitter coil and the power receiver coil approach each other and comparing the stored impedance value with a measured value, it may be determined whether the power receiver coil approaches the power transmitter coil. When the control device 70 detects that the first power receiver coil 310 has stopped at a position where power transfer with the first power transmitter coil 213 is possible, the output of the inverter 210 is temporarily stopped or made smaller than that of a normal operation.

The first load detector circuit 60 detects a remaining battery level of the first load device 50 and periodically sends the information on the remaining battery level to the control device 70. The information transmission interval is of the order of milliseconds or seconds, for example, but is not specified. The control device 70 determines, on the basis of the value of the remaining battery level sent from the first load detector circuit 60, whether the first load device 50, which is the battery of the first elevator car 4, needs to be charged. When the control device 70 determines, on the basis of the remaining battery level of the first load device 50, that charging is necessary, it sends an instruction to the power transmitting device 20 to turn on the first switch 211 and thus connect the inverter 210 and the first power transmitter coil 213. When the control device 70 determines that charging of the first load device 50 is unnecessary, it sends an instruction to the power transmitting device 20 to leave the first switch 211 in the OFF state and thus not to perform power transfer from the power transmitting device 20 to the first load device 50 by not connecting the inverter 210 and the first power transmitter coil 213. At this time, since the second elevator car 5 is not at a position where power can be supplied, the second switch 212 maintains the OFF state regardless of whether the first switch 211 is in the ON state or the OFF state.

When it is determined that charging is necessary, the control device 70 operates a switching device of the inverter 210 to supply a predetermined power to the first power transmitter coil 213. The power supplied to the first power transmitter coil 213 is transmitted in a non-contact manner to the first power receiver coil 310, which is magnetically coupled to the first power transmitter coil 213. The AC power supplied to the first power receiver coil 310 is rectified by the first rectifier circuit 311 and outputted to the first load device 50. The first load device 50, which is a battery, stores the electric power outputted from the first rectifier circuit 311, and the stored power is used for the operation of the electric equipment and the like provided in the elevator car.

(B) Case where Power is Supplied Simultaneously to Two Elevator Cars

Next, a control method used when power is supplied to the two elevator cars simultaneously, especially when power supply becomes required for the second elevator car 5 while the first elevator car 4 is being supplied with power, will be described. The description will be given assuming that in the case (A) described above, that is, in the case where the first load device 50 is being charged, the second elevator car 5 stops at the same power supply floor and the second load device 51 requires power supply.

The power supply to the first load device 50 is performed using the same method as described in the case (A) above, and the description thereof will be omitted. When the second elevator car 5 stops at the same power supply floor as that of the first load device 50 while the first load device 50 is being supplied with power, the control device 70 determines whether the second power receiver coil 410 stops at a position where power transfer with the second power transmitter coil 214 is possible. The description of this determination is omitted because the determination is performed using the same method as used in the determination of whether the first power receiving device 30 installed in the first elevator car 4 is stopped at a position where power transfer with the power transmitting device 20 is possible. When the control device 70 determines that the second power receiver coil 410 has stopped at a position where power transfer with the second power transmitter coil 214 is possible, it determines whether the second load device 51 requires charging on the basis of the detection result sent from the second load detector circuit 61. When the control device 70 determines from the remaining battery level of the second load device 51 that charging is required, it adjusts the output power of the inverter 210 to temporarily reduce the power to be supplied to the first load device 50 to be very low. The output of the inverter 210 may be stopped.

Next, the control device 70 instructs the power transmitting device 20 to turn on the second switch 212. As a result, the first power transmitter coil 213 and the second power transmitter coil 214 are connected, in parallel to each other, to the output terminals of the inverter 210. As described above, by turning the switch with the output power of the inverter 210 temporarily adjusted to a low level, it is possible to prevent overvoltage in one of the batteries and to reduce load on the inverter 210 due to rapid impedance changes. After turning the second switch 212, the control device 70 increases the output power of the inverter 210, which allows the inverter 210 to supply power to the first load device 50 and the second load device 51 at the same time.

The control device 70 increases the output power of the inverter 210 while constantly monitoring the battery voltages of the first load device 50 and the second load device 51 sent from the first load detector circuit 60 and the second load detector circuit 61 to supply power to both of the load devices. When at least one of the battery voltage of the first load device 50 and the battery voltage of the second load device 51 exceeds a predetermined threshold, the increase of the output power of the inverter 210 is stopped. This threshold is determined to be a value that does not cause overvoltage in either the first load device 50 or the second load device 51, both of which are batteries. While maintaining its output power, the inverter 210 charges the first load device 50 and the second load device 51 via the first power transmitter coil 213 and the second power transmitter coil 214, respectively. By doing this, it is possible to simultaneously supply power to a plurality of load devices with different remaining battery levels using only one power transmitting device 20.

The control device 70 temporarily reduces the output power of the inverter 210 when it determines, on the basis of the remaining battery level transmitted from the first load detector circuit 60, that the charging of the first load device 50 is completed. Next, the control device 70 turns off the first switch 211 with the output power of the inverter 210 reduced, disconnects the path between the inverter 210 and the first power transmitter coil 213, and stops the power transfer from the inverter 210 to the first load device 50. After turning the first switch 211, the control device 70 reactivates the inverter 210 to increase the output power of the inverter 210 and charges the second load device 51 via the second power transmitter coil 214.

By performing the control as described above, a plurality of batteries can be charged at the same time in accordance with their remaining battery levels that differ from battery to battery. In addition, by controlling the switches so as not to be turned when the inverter 210 is operated at high output, rapid changes in impedance are suppressed, so that failure of the inverter 210 and deterioration of the batteries due to overcharge can be suppressed. At this time, instead of lowering the output power of the inverter 210, the power supply from the inverter 210 may be temporarily stopped. In that case, the control device 70 temporarily stops the power supply from the inverter 210 and turns the first switch 211 in this state. After turning the first switch 211, the control device 70 reactivates the inverter 210 to increase the output power of the inverter 210 and supplies power to the second load device 51 via the second power transmitter coil 214.

To stop the power supply to the second load device 51, the same method as described above is used. Instead, the power transfer to the second load device 51 may be stopped by turning the switch to disconnect the path between the inverter 210 and the second power transmitter coil when the inverter 210 is operated. However, in this case, the control device 70 stops the output of the inverter 210 after turning the switch. When the power supply to the first load device 50 and the second load device 51 at the same time is stopped, it is stopped in the same way.

As described above, the wireless power supply system for elevators and the elevator system shown in the present embodiment have a configuration in which two circuits, each of which has a switch and a power transmitter coil connected in series, are connected to an inverter, which is connected to a power supply, in parallel to each other, and each of the coils can face a power receiver coil attached to each of two elevator cars. The power transmitting device is given an instruction, based on the detection result of a load detector circuit attached to each of the elevator cars, about turning on/off of the switches and the amounts of charge, and is operated. This makes it possible to efficiently perform power transfer to the load devices installed in the two elevator cars with one power transmitting device.

Embodiment 2

In the wireless power supply system for elevators and the elevator system shown in Embodiment 1, the power transmitting device includes one power transmitting unit corresponding to both of the two power receiving devices, and the two power receiving devices each include one power receiving unit. In a wireless power supply system for elevators and an elevator system according to Embodiment 2, the power transmitting device includes a plurality of power transmitting units, and the two power receiving devices each include a plurality of power receiving units. As with the description in Embodiment 1, the case where the load devices are batteries will be described, but needless to say, the configuration is not limited to this. Here, the case where the power transmitting device includes two power transmitting units and the two power receiving devices each include two power receiving units will be shown. However, the configuration is not limited to this, and the power transmitting device may include three or more power transmitting units, and the two power receiving devices may each include three or more power receiving units. In addition, the number of power transmitting units included in the power transmitting device does not necessarily have to match the number of power receiving units included in each power receiving device.

Figure 4:
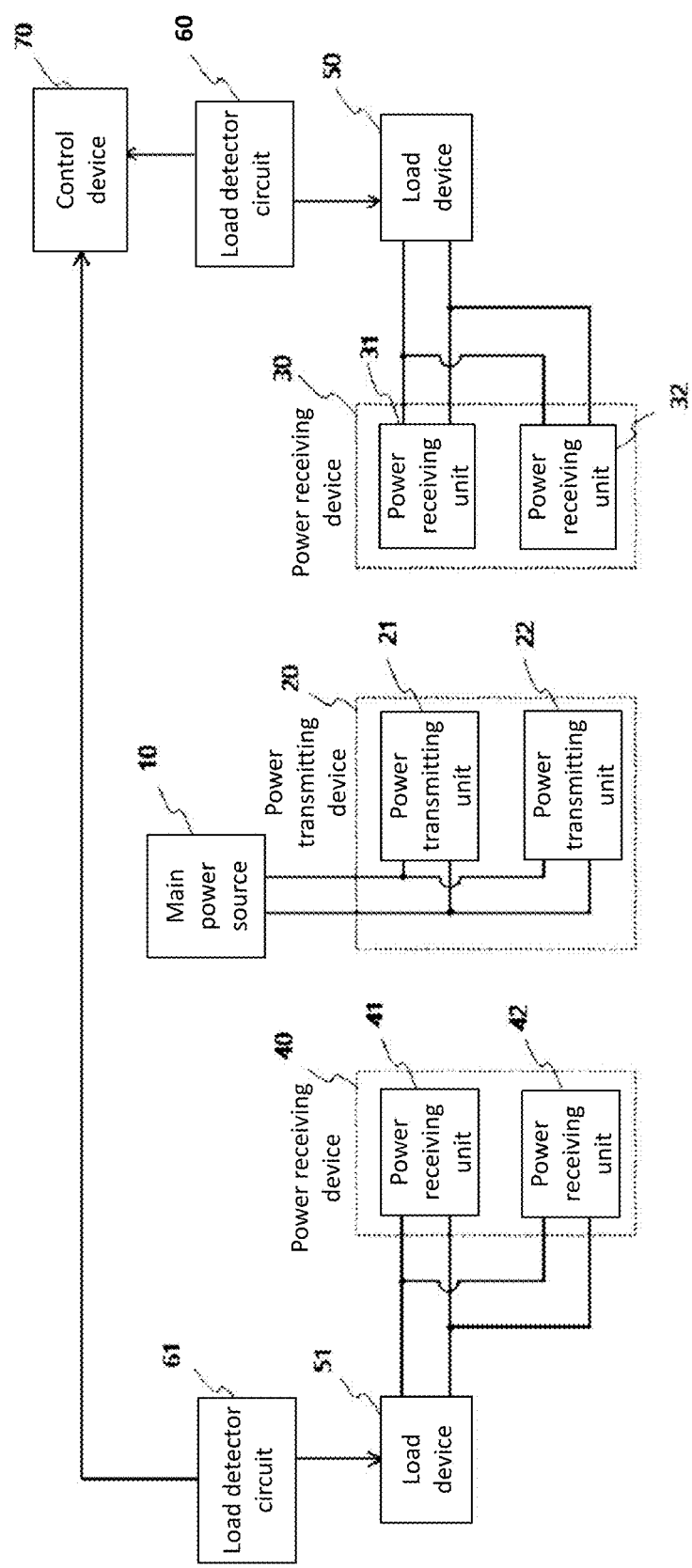
FIG. 4 is a circuit block diagram of a wireless power supply system according to Embodiment 2 of the present disclosure.

The configurations of the wireless power supply system for elevators and the elevator system according to Embodiment 2 are the same as those shown in FIGS. 1 and 2, so that the description will be omitted. FIG. 4 shows a circuit block diagram of the wireless power supply system for elevators according to Embodiment 2. Among the components shown in the block diagram of FIG. 4, the same components as those shown in the circuit block diagram shown in FIG. 3 are designated by the same reference numerals, and their description will be omitted as appropriate. In the wireless power supply system for elevators according to the present embodiment, the power transmitting device 20 includes two power transmitting units, and the first and the second power receiving devices also each include two power receiving units.

Figure 5:
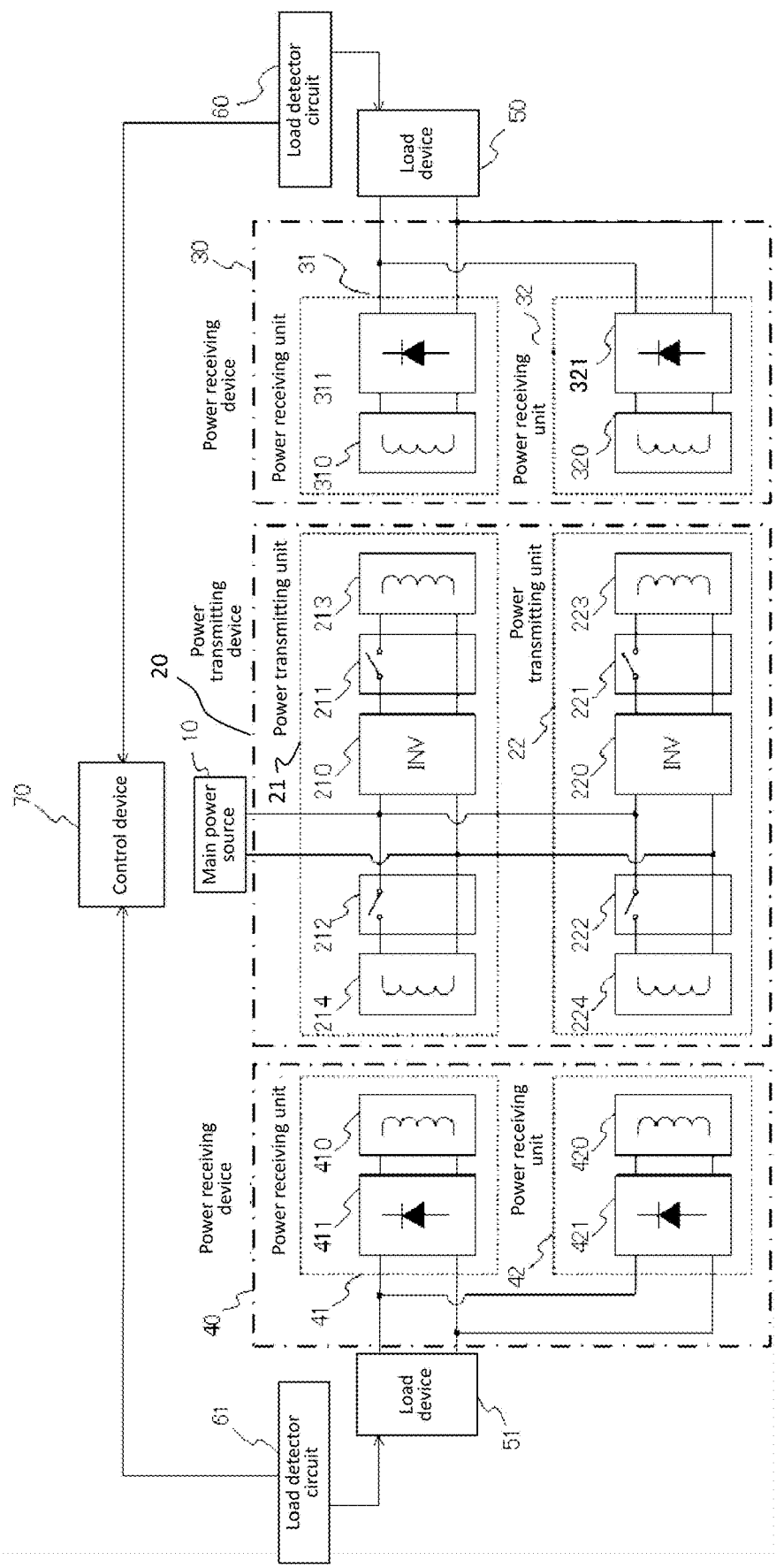
FIG. 5 is a circuit block diagram of the wireless power supply system according to Embodiment 2 of the present disclosure.

FIG. 5 shows a circuit block diagram of the wireless power supply system for elevators according to the present embodiment. The power transmitting device 20 includes two power transmitting units (a power transmitting unit 21, a power transmitting unit 22). Each of these two power transmitting units has the same configuration as the power transmitting unit shown in Embodiment 1. The power transmitting unit 21 includes: the inverter 210 that is connected to the main power source 10 and converts input power from the main power source 10 into AC power for output, the first switch 211 and the second switch 212 connected to output terminals (AC side terminals) of the inverter 210; the first power transmitter coil 213 connected in series to the first switch 211; and the second power transmitter coil 214 connected in series to the second switch 212. The first switch 211 and the second switch 212 are connected in parallel to each other, and the first power transmitter coil 213 and the second power transmitter coil 214 are connected in parallel to each other.

Similarly, the power transmitting unit 22 includes: the inverter 220 that is connected to the main power source 10 and converts input power from the main power source 10 into AC power for output, a third switch 221 and a fourth switch 222 connected to output terminals (AC side terminals) of the inverter 220; a third power transmitter coil 223 connected in series to the third switch 221; and a fourth power transmitter coil 224 connected in series to the fourth switch 222. The third switch 221 and the fourth switch 222 are connected in parallel to each other, and the third power transmitter coil 223 and the fourth power transmitter coil 224, are connected in parallel to each other. In addition, the power transmitting unit 21 and the power transmitting unit 22 are connected to the main power source so as to be parallel to each other.

The first power receiving device 30 includes two power receiving units (the first power receiving units) corresponding to the power transmitting units of the power transmitting device 20, and the two power receiving units (the power receiving unit 31, a power receiving unit 32) are connected so as to be parallel to each other. The power receiving unit 31 includes the first power receiver coil 310, which can be magnetically coupled with the first power transmitter coil 213 when the first elevator car 4 stops at a power supply floor, and the first rectifier circuit 311 connected to the first power receiver coil 310 to rectify AC power from the first power receiver coil 310. In addition, the first load device 50 is connected to the first rectifier circuit 311.

The power receiving unit 32, which has the same configuration as the power receiving unit 31, includes the third power receiver coil 320, which can be magnetically coupled with the third power transmitter coil 223 when the first elevator car 4 stops at a power supply floor, and the third rectifier circuit 321 connected to the third power receiver coil 320 to rectify AC power from the third power receiver coil 320. In addition, the first load device 50 is connected to the third rectifier circuit 321. Further, the power receiving unit 31 and the power receiving unit 32 are connected to the first load device 50 so as to be parallel to each other.

The second power receiving device 40, which has the same configuration as the first power receiving device 30, includes two power receiving units (the second power receiving units) corresponding to the two power transmitting units of the power transmitting device 20, and the two power receiving units (the power receiving unit 41, a power receiving unit 42) are connected so as to be parallel to each other. The power receiving unit 41 includes the second power receiver coil 410, which can be magnetically coupled with the second power transmitter coil 214 when the second elevator car 5 stops at a power supply floor, and the second rectifier circuit 411 connected to the second power receiver coil 410 to rectify AC power from the second power receiver coil 410. The second load device 51 is connected to the second rectifier circuit 411.

The power receiving unit 42, which has the same configuration as the power receiving unit 41, includes a fourth power receiver coil 420, which can be magnetically coupled with the fourth power transmitter coil 224 when the second elevator car 5 stops at a power supply floor, and a fourth rectifier circuit 421 connected to the fourth power receiver coil 420 to rectify AC power from the fourth power receiver coil 420. In addition, the second load device 51 is connected to the fourth rectifier circuit 421. Further, the power receiving unit 41 and the power receiving unit 42 are connected to the second load device 51 so as to be parallel to each other.

On the basis of the detection results of the first load detector circuit 60 and the second load detector circuit 61, the control device 70 sends signals for starting or stopping power supply to the first load device 50 and the second load device 51 to the switches (the first to fourth switches) included in the power transmitting unit 21 and the power transmitting unit 22 of the power transmitting device 20. In addition, the control device 70 has functions to determine the amounts of charge for the first load device 50 and the second load device 51 on the basis of the detection results of the first load detector circuit 60 and the second load detector circuit 61 and to adjust the output power of the inverters included in the power transmitting unit 21 and the power transmitting unit 22. In other words, the control device 70 determines duty ratios of the switches included in the inverter 210 and the inverter 220 on the basis of the detection results of the first load detector circuit 60 and the second load detector circuit 61, and sends a control signal to each of the switches included in the inverter 210 and the inverter 220 on the basis of the determined duty ratios.

Furthermore, in addition to the overall control of raising and lowering the elevator cars, the control device 70 determines whether the first power transmitter coil 213 and the first power receiver coil 310 or the third power transmitter coil 223 and the third power receiver coil 320 are stopped at positions where they can perform power supply. The determination of whether each power receiver coil has stopped at a position where power can be supplied is made with the same method as that shown in Embodiment 1, and the description thereof will be omitted.

In Embodiment 2, the first to fourth switches are provided in the power transmitting device 20, but the configuration is not limited to this, and these switches may be provided on the power receiving devices' side. Specifically, each switch only needs to be positioned so that the inverters can be disconnected from the first load device and the second load device. For example, the following configuration is also possible; the first switch 211 is placed between the first power receiver coil 310 and the first rectifier circuit 311, the second switch 212 is placed between the second power receiver coil 410 and the second rectifier circuit 411, the third switch 221 is placed between the third power receiver coil 320 and the third rectifier circuit 321, and the fourth switch 222 is placed between the fourth power receiver coil 420 and the fourth rectifier circuit 421.

In addition, in the wireless power supply system for elevators according to the present embodiment, the case where the two power transmitting units are provided and each power receiving device includes two power receiving units is shown. However, the configuration is not limited to this as described above. The number of units to be installed is determined according to the requirements of the elevator system and other factors. There are several ways to determine the number of power transmitting units and power receiving units to be installed, and the output capacity per power transmitting unit. For example, the determination may be made from a value obtained by dividing the maximum output capacity of the elevator system at the time of design by the number of units to be installed. For example, the output capacity per unit is represented by the maximum output capacity divided by the total number of units. Thus, for an elevator system with the maximum output power of 12 kW and four units to be installed, 12 kW/4 units=3 kW is given.

In addition, the output capacity per power transmitting unit may be set in advance, and as many units as the number obtained by dividing the output capacity of the elevator system by the output capacity per unit may be operated to charge the batteries.

For example, the number of units required for the elevator system is represented as follows.

The maximum output capacity/the output capacity per unit=the number of units required to be operated.

Assuming that the output power per unit is 3 kW, a 12-kW elevator system requires four power transmitting units since 12 kW/3 kW=4.

In the present embodiment, the case where the maximum output capacity of the elevator system is 6 kW and two units are installed will be described. In this case, the output capacity per power transmitting unit is 3 kW according to the following calculation.

6 kW/2 units=3 kW.

Next, the operation will be described. First, the case where power is supplied only to the first elevator car 4 will be described.

(A) Case where Power is Supplied Only to the First Elevator Car 4

Here, the case where only the first elevator car 4 stops at a power supply floor and power is supplied only to the first load device 50 will be described. The control device 70 determines whether the first power receiver coil 310 and the third power receiver coil 320 are stopped at a position where they are magnetically coupled with the first power transmitter coil 213 and the third power transmitter coil 223, respectively, so as to be able to receive power. When the control device 70 determines that the first power receiver coil 310 and the third power receiver coil 320 have stopped at respective positions where power transfer with the first power transmitter coil 213 and the third power transmitter coil 223 is possible, the output of the inverter 210 is temporarily decreased or stopped.

The first load detector circuit 60 detects a remaining battery level of the first load device 50 and periodically sends information about the remaining battery level to the control device 70. The information transmission interval is of the order of milliseconds or seconds, for example. The control device 70 determines the necessity of power transfer to the first load device 50 on the basis of the value of the remaining battery level sent from the first load detector circuit 60, and the required charging power is calculated when it is determined that the power supply is necessary. When the control device 70 determines, from the remaining battery level of the first load device 50, that power supply is necessary, the number of power transmitting units to be used in the power transmitting device 20 is determined from the calculated charging power. After determining the number of power transmitting units, the switches are turned in accordance with the determined number of units to select the power transmitting units to be operated. In general, in a wireless power supply system, a power transmitting device and a power receiving device can operate with high efficiency at high output, and efficiency deteriorates at low output. Therefore, by adjusting the number of units to be operated during charging and operating the power transmitting units and the power receiving units at their respective maximum outputs or at the outputs close to those, highly efficient power transfer is possible.

Figure 6:
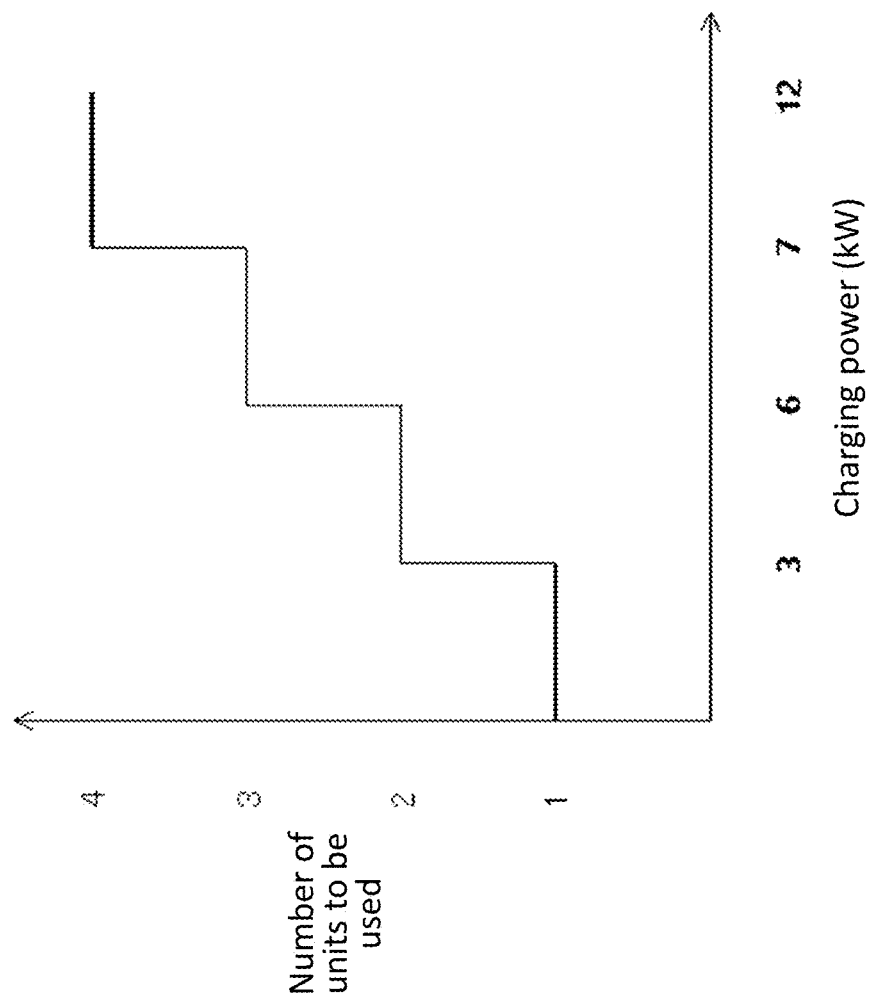
FIG. 6 is an explanatory diagram relating to a method for determining units to be used by the wireless power supply system according to Embodiment 2 of the present disclosure.

The control device 70 determines the number of power transmitting units and power receiving units to be operated on the basis of the required charging power. FIG. 6 shows how the number of power transmitting units and power receiving units to be operated is determined when it is assumed that the maximum power of each of the power transmitting units and the power receiving units is 3 kW and the number of power transmitting units and power receiving units included in the power transmitting device and each power receiving device, respectively, are four each. As shown in FIG. 6, when the determined charging power is 0 to 3 kW, the number of units to be used is one each. When the determined charging power is 3 kW to 6 kW, the number of units to be used is two each. In this way, by adjusting the number of units to be operated according to the charging power, it is possible to take advantage of the characteristics distinctive to wireless power supply, which is high efficiency at high output, and thus to improve system efficiency of the elevator system.

A control method to be performed when the control device 70 determines, on the basis of the remaining battery level transmitted from the first load detector circuit 60, that two units are to be used to charge the first load device 52 will be described. When the control device 70 determines that the first load device 50 needs to be charged, it sends an instruction to turn on the first switch 211 and the third switch 221 to connect the path between the first power transmitter coil 213 and the inverter 210 and connect the path between the third power transmitter coil 223 and the inverter 220. When it is determined that the first load device 50 does not need to be charged, an instruction is sent to keep the first switch 211 and the third switch 221 in the OFF state to perform no power transfer from the power transmitting device 20 to the first load device 50. The control device 70 operates the inverter 210 and the inverter 220 to increase the output and charge the first load device 50. The control device 70 increases the output power of the inverter 210 and the inverter 220 while constantly monitoring the battery voltage of the first load device 50 detected by the first load detector circuit 60. When the battery voltage of the first load device 50 exceeds a predetermined threshold, the control device 70 stops the increase of the output power of the inverter 210 and the inverter 220. After that, the inverter 210 and the inverter 220 charge the first load device 50 while maintaining their output power.

When the control device 70 determines, on the basis of the detection result sent from the first load detector circuit 60, that the charging of the first load device 50 is completed, it temporarily reduces the output power of the inverter 210 and the inverter 220, and then, turns off the first switch 211 and the third switch 221, disconnects the path on the side of the power transmitting unit 21 and the path on side of the power transmitting unit 22, to stop the power transfer to the first load device 50. As described above, by not turning off the switches when the inverters are operated at high output, rapid changes in impedance are suppressed, so that failure of the inverters and deterioration of the batteries due to overcharge can be suppressed. At this time, instead of lowering the output power of the inverters, the power supply from the inverters may be temporarily stopped. In this way, by increasing the number of power transmitting units used to charge the load devices, the charging power can be increased and the charging time can be shortened, so that the operation efficiency of the elevator can be improved.

(B) Case where Power is Supplied to Two Elevator Cars

Next, the case where while the first elevator car 4 is stopped at a power supply floor, the second elevator car 5 stops at the power supply floor, and the power transmitting device supplies power to both of the two elevator cars will be described.

When the control device 70 determines that the second elevator car 5 has stopped at the power supply floor, the control device 70 determines, on the basis of the detection result of the second load detector circuit 61, whether the second load device 51 needs to be charged. When it is determined that charging is necessary, the number of power receiving units and power transmitting units to be operated are determined, and then the switches are turned on the basis of the determined number. Here, if the charging power to the second load device 51 requires 3 to 6 kW, the control device 70 determines to operate the two power transmitting units to charge the second load device 51. Then, the control device 70 adjusts the output power of the inverter 210 and the inverter 220 and temporarily reduces the power transmitted to the first load device 50 to be very low.

The control device 70 turns on the second switch 212 and the fourth switch 222 with the output power of the inverter 210 and the inverter 220 reduced, so that the first power transmitter coil 213 and the second power transmitter coil 214 are connected in parallel to each other to the output of the inverter 210, and the third power transmitter coil 223 and the fourth power transmitter coil 224 are connected in parallel to each other to the output of the inverter 220. As described above, by turning the switch with the output power of the inverters temporarily adjusted to a low level, it is possible to prevent overcharging one of the batteries and reduce load on the inverters due to rapid impedance changes.

The control device 70 turns on the second switch 212 and the fourth switch 222 and then increases the output power of the inverter 210 and the inverter 220. Thus, the inverter 210 and the inverter 220 charge the first load device 50 and the second load device 51 at the same time. The control device 70 increases the output power of the inverters while constantly monitoring the battery voltage of the first load device 50 detected by the first load detector circuit 60 and the battery voltage of the second load device 51 detected by the second load detector circuit 61, and when the battery voltage of one of the batteries exceeds a predetermined threshold, the control device 70 stops increasing the output power of the inverters. After that, the first load device 50 and the second load device 51 are charged at the same time while the output power of the inverter 210 and the inverter 220 are maintained.

When charging of the first load device 50 is completed, the control device 70 turns off the first switch 211 and the third switch 221 with the output power of the inverter 210 and the inverter 220 temporarily reduced to cut off both of the path of the power transmitting unit 22 and the path of the power transmitting unit 21, thereby stops charging the first load device 50. After turning off the first switch 211 and the third switch 221, the control device 70 reactivates the inverter 210 and the inverter 220 to increase their output power and charges the second load device 51.

This allows the batteries to be charged in accordance with their remaining battery levels that differ from battery to battery. Furthermore, by controlling the switches so as not to be turned on/off when the inverters are operated at high output, rapid changes in impedance are suppressed, so that failure of the inverters and deterioration of the batteries due to overcharging can be suppressed. At this time, instead of lowering the output power of the inverter 210 and the inverter 220, the power supply from the inverter 210 and the inverter 220 may be temporarily stopped. In that case, the control device 70 temporarily stops the power supply from the inverter 210 and the inverter 220, and then turns off the first switch 211 and the third switch 221. After turning off the first switch 211 and the third switch 221, the control device 70 operates the inverter 210 and the inverter 220 again and increases their output power to charge the second load device 51.

When charging of the second load device 51 is completed, the process to end the charging is performed in the same manner as when the charging of the first load device 50 is completed. In a case where the charging of the first load device 50 and the charging of the second load device 51 are completed at the same time, and the power supply to the first load device 50 and the power supply to the second load device 51 are to be stopped at the same time, the control device 70 turns off the first to fourth switches to cut off the path of the power transmitting unit 21 and the path of the power transmitting unit 22 with the output power of the inverter 210 and the inverter 220 temporarily reduced or stopped. Thus, charging of the first load device 50 and the second load device 51 is completed.

Further, after the charging of the first load device 50 is completed, the number of power receiving units and power transmitting units to be operated again may be determined. That is, if it is possible to charge the second load device 51 with one power transmitting unit, only one of the power transmitting unit 21 and the power transmitting unit 22 may be used. For example, if the power transmitting unit 21 alone charges the second load device 51, when the control device 70 stops charging the first load device 50 and reduces the output power of the inverter 210 and the inverter 220, it turns off the fourth switch 222 and turns on only the second switch 212. As a result, the path of the power transmitting unit 21 is connected and the path of the power transmitting unit 22 is disconnected. The control device 70 operates only the inverter 210 again, increases the output, and charges the second load device 51. When the control device 70 determines, from the remaining battery level of the second load device 51, that the charging is completed, it turns off the second switch 212 with the output of the inverter 210 temporarily reduced. After turning off the second switch 212, the control device 70 stops the operation of the inverter 210. Alternatively, the second switch 212 may be turned off while the inverter 210 is stopped.

As described above, according to Embodiment 2, the power transmitting device and the power receiving device are configured to include a plurality of power transmitting units and power receiving units, respectively, so as to increase the charging power and shorten the charging time, thereby improving the operation efficiency of the elevator system. In addition, by adjusting the number of units to be used on the basis of the charging power required for the load devices, the feature of wireless power supply that the higher efficiency can be achieved when the units are operated at the higher outputs can be better utilized. Therefore, the efficiency of power transfer from the power transmitting device to the load devices can be improved, and thus the efficiency of the elevator system can be improved.

The determinations of the output capacity of one unit and the number of units to be used, as well as the output power amount per unit, shown in Embodiment 2, are just examples and are not limited to these. In addition, the output power of the inverters, how to turn on/off the switches, as well as the installation positions of the switches, the power transmitter coils, and the power receiver coils, are not limited to the examples as long as the same functions can be performed and the same effects can be achieved as described above.

According to Embodiment 2, the power transmitting device and the power receiving device are configured to include a plurality of power transmitting units and the power receiving units, respectively. In this configuration, the characteristics of each power transmitting unit and each power receiving unit (for example, power to be supplied for achieving maximum efficiency) may be the same or different. When the maximum output power of each power transmitting unit and power receiving unit is different from each other, the degree of freedom in combining the power transmitting units and the power receiving units to achieve the optimum efficiency is increased, which leads to a highly efficient operation.

Embodiment 3

Embodiment 3 describes a case where two elevator cars are stopped at a power supply floor and one of them is preferentially charged.

A wireless power supply system for elevators and an elevator system according to Embodiment 3 are the same as those according to Embodiment 2. The overall configuration of the elevator is the same as that shown in FIGS. 1 and 2, and the circuit block is the same as that shown in FIGS. 4 and 5. Each configuration is the same as that shown in Embodiment 1 and Embodiment 2, and the description thereof will be omitted.

Here, the description is made assuming the case in which, when the elevator cars in the two adjacent hoistways are stopped at the same power supply floor and one power transmitting device 20 is supplying power to the first load device 50 and the second load device 51, the first elevator car 4 is called from another floor. In the description, it is also assumed that the remaining battery level of the first load device 50, which is the battery installed in the first elevator car 4, is lower than a predetermined threshold and, thus, the first load device 50 needs to be charged in preference to the second load device 51. The control methods to be used in this case are shown below. Any of a plurality of control methods shown below may be used. Also, these control methods may be switched in accordance with the remaining battery levels of the load devices.

(Temporary Charging with Two Units)

When the remaining battery level of the first load device 50 provided in the first elevator car 4 is lower than a predetermined threshold, if a call occurs for the first elevator car 4, the control device 70 determines to charge preferentially the first load device 50. If the control device 70 determines to preferentially charge the first load device 50, it temporarily reduces the output power of the inverter 210 and the inverter 220 to be very low. In this state, the control device 70 turns off the second switch 212 and the fourth switch 222 to cut off the path between the inverter 210 and the second power transmitter coil 214 as well as the path between the inverter 220 and the fourth power transmitter coil 224. The control device 70 increases the output of the inverter 210 and the inverter 220, and when the battery voltage of the first load device 50 exceeds a predetermined threshold, it stops increasing the output power of the inverter 210 and the inverter 220.

The inverter 210 and the inverter 220 charge the first load device 50 while maintaining their output power. When the charging of the first load device 50 is completed, the control device 70 reduces the output power of the inverter 210 and the inverter 220, turns off the first switch 211 and the third switch 221 to stop the power supply to the first load device 50. At the same time, the control device 70 turns on the second switch 212 and the fourth switch 222 to start charging the second load device 51. The first load device 50 moves to the calling floor after the charging is complete.

(One Unit Charges Two Load Devices, Another Unit Charges Only One Load Device)

Even if it is determined that the first load device 50 is to be charged with priority, there may be a case in which it is further determined from the remaining battery level of the first load device 50 that it is not necessary to charge only the first load device 50 using the two power transmitting units. In that case, one power transmitting unit may charge the two load devices at the same time, and the other power transmitting unit may charge only the first load device 50. In other words, the first load device 50 is charged by the two power transmitting units and the two power receiving units, and the second load device 51 is charged by one of the power transmitting units and one of the power receiving units. The control operation in this case will be described.

In order to charge the first load device 50 preferentially, the control device 70 turns the switches so that the power transmitting unit 22 will charge only the first load device 50. The control device 70 reduces the output power of the inverter 210 and the inverter 220 to be very low, turns off the fourth switch 222 to disconnect the path between the inverter 220 and the fourth power transmitter coil 224, and stops charging the second load device 51 by the power transmitting unit 22. Next, while constantly monitoring the battery voltage of the first load device 50 and the battery voltage of the second load device 51 detected by the first load detector circuit 60 and the second load detector circuit 61, respectively, the control device 70 increases the output power of the inverter 210 and the inverter 220, and when either the battery voltage of the first load device 50 or the battery voltage of the second load device 51 exceeds a predetermined threshold, it stops increasing the output power of the inverter 210 and the inverter 220. Also, as for the inverter 220, its output power is increased in the same way as the inverter 210. At this time, the output power of the inverter 210 and the output power of the inverter 220 do not necessarily have to match if no overvoltage occurs in the first load device 50 or the second load device 51.

In this way, the power transmitting unit 21 charges the first load device 50 and the second load device 51 at the same time, and the power transmitting unit 22 charges only the first load device 50, so that preferential charging of the first load device 50 is possible. In addition, the charging time for the load device that is determined to be charged preferentially can be shortened, and as a result, calls from an external control device (not shown) can be responded quickly, so that the operation efficiency of the elevator can be further improved.

(One Unit Charges One Load Device)

If the power transmitting device includes three or more power transmitting units and the power receiving device includes three or more power receiving units, the number of power transmitting units and power receiving units to be used to charge the prioritized load device may be set greater than the number of power transmitting units and power receiving units to be used to charge the non-prioritized load device. For example, a case where three power transmitting units are installed in the power transmitting device 20 and three power receiving units are installed in each of the first power receiving device and the second power receiving device will be described. At this time, two power transmitting units may charge two power receiving units of one of the elevator cars, and the other power transmitting unit may charge one power receiving unit of the other elevator car.

Also, in an elevator system that includes three power transmitting units, three power receiving units in one elevator car, and three power receiving units in the other elevator car, it is assumed that one power transmitting unit is charging one power receiving unit in one of the elevator cars, another power transmitting unit is charging one power receiving unit in the other elevator car, and one of the three power transmitting units is not in use. In this case, if charging of the load of one elevator car is prioritized, the unused power transmitting unit may be operated to charge only the load device of the elevator car that has priority of charging.

As described above, according to Embodiment 3, the power transmitting device is configured to include a plurality of power transmitting units, and each of a plurality of power receiving devices is configured to include a plurality of power receiving units. With this configuration, it is possible to adjust the number of power transmitting units and the number of power receiving units to charge each of the load devices in various combinations, taking into consideration the power consumptions and the remaining battery levels of the load devices. This enables shortening the charging time and preferential charging of one load device over the other, improving the operational efficiency of the elevator system by allowing short travel time when a call to another floor occurs.

The determinations of the output capacity of one unit and the number of units to be used, as well as the output power per unit, shown in Embodiment 3 are just examples and are not limited to these. In addition, the output power of the inverters, how to turn on/off the switches, as well as the installation positions of the switches, the power transmitter coils, and the power receiver coils are just examples and they are not limited to the examples. Furthermore, not limited to the above, the control device 70 may determine only the number of units to be used without specifying the units to be used as long as the same function and effect can be achieved.

Embodiment 4

A wireless power supply system for elevators and an elevator system according to Embodiment 4 include a plurality of power supply floors. The following description is about the case where the number of power transmitting units included in the power transmitting device of at least one power supply floor is different from the number of power transmitting units included in the power transmitting device of each of the other power supply floors. By considering the number of power supply floors installed, the number of power transmitting devices installed at each power supply floor, and the number of power receiving units, on the basis of a stop time and a utilization rate for each power supply floor, it is possible to simplify the structure of the elevator system and improve the operation efficiency thereof.

FIG. 7 shows a configuration diagram of the wireless power supply system for elevators and the elevator system according to Embodiment 4. In the elevator system shown in FIG. 7, the two elevators (the first elevator 2 and the second elevator 3) are arranged side by side with a wall in between as in the embodiments described above. The same components as those in Embodiments 1 to 3 are designated by the same reference numerals, and the description thereof will be omitted as appropriate. A plurality of power transmitting devices is installed at the wall provided between the first elevator 2 and the second elevator 3. The elevator system shown in FIG. 7 shows a configuration in which two power supply floors are provided (power supply floor A, power supply floor B). However, needless to say, this is not a limitation and the configuration may have three or more power supply floors each of which includes a power transmitting device.

In the elevator system shown in FIG. 7, a power transmitting device 20*a* and a power transmitting device 20*b* connected to an AC or DC power source (not shown) are connected to the control device 70. The power transmitting device 20*a* is installed on the power supply floor A, and the power transmitting device 20*b* is installed on the power supply floor B. In addition, the power transmitting device 20*a* includes four power transmitting units shown in Embodiment 2, namely, the power transmitting units 21*a* to 24*a*. On the other hand, the power transmitting device 20*b* includes two power transmitting units shown in Embodiment 2, namely, the power transmitting units 21*b* and 22*b*.

The first power receiving device 30 provided in the first elevator car 4 includes four power receiving units (power receiving units 31 to 34). This number corresponds to the number of power transmitting units of the power transmitting device having the largest number of installed power transmitting units among the plurality of power transmitting devices. Similarly, the second power receiving device 40 provided in the second elevator car 5 includes four power receiving units (power receiving units 41 to 44). In the following, a description is made assuming that the first load device 50 and the second load device 51 are batteries, as in Embodiments 1 to 3.

The power transmitting device 20*a* with the four power transmitting units is installed on the power supply floor A, which is a stopping floor with a long stop time and a high utilization rate in the expected operation, and is installed at a position where the first power receiving device 30 and the second power receiving device 40 can be supplied with power from the power transmitting device 20*a* when the first elevator car 4 and the second elevator car 5 are stopped at the power supply floor A. The power transmitting device 20*b* is installed on the power supply floor B, which is a stopping floor with a shorter stop time and a lower utilization rate when compared with the power supply floor A in the expected operation, and is installed at a position where the first power receiving device 30 and the second power receiving device 40 can be supplied with power from the power transmitting device 20*b* when the first elevator car 4 and the second elevator car 5 are stopped at the power supply floor B.

The power transmitting device 20*a* including the largest number of power transmitting units among the plurality of power transmitting devices is installed on the power supply floor A where the longest charging time can be secured. On this floor, therefore, the number of units connected in parallel is increased to raise the charging power. This makes it possible to efficiently supply power to the first load device 50 and the second load device 51. As a result, the number of charging times can be reduced and the charging time on the other power supply floors can be shortened, so that the operational efficiency of the elevator can be improved.

In addition, the power transmitting device 20*a* operates the plurality of power transmitting units to charge the first load device 50 and the second load device 51 with most of the power they consumed. Therefore, even if the charging power of the power transmitting device 20*b* is lowered, the effect on the operation of the elevator is small. As a result, the number of power transmitting units to be installed in the power transmitting device 20*b* can be reduced, and thus the operation efficiency can be improved while simplifying the structure of the elevator.

As described above, in Embodiment 4, by installing a large number of power transmitting units on a power supply floor where a number of stops are large and a stop time is long, the remaining battery levels of the load devices can be kept high, and by installing a smaller number of power transmitting units on a power supply floor where the number of stops is smaller and the stop time is shorter than the floor mentioned above, size expansion and complication of the structure of the elevator system can be avoided; this improves the operational efficiency of the elevator system.

In Embodiment 4, the maximum number of units are installed on the power supply floor A, and a smaller number of the units, compared with the power supply floor A, are installed on the power supply floor B. However, this configuration is merely an example, and the locations of the power supply floors, the number of power supply floors, and the number of units are not limited by the example if the same functions can be implemented and the same effects can be achieved.

DESCRIPTION OF SYMBOLS

1: . . . elevator system,
2: . . . first elevator,
3: . . . second elevator,
4: . . . first elevator car,
5: . . . second elevator car,
6: . . . first hoistway,
7: . . . second hoistway,
8: . . . first entrance/exit doors,
9: . . . second entrance/exit doors,
10: . . . main power source,
20: . . . power transmitting device,
21-22: . . . power transmitting unit,
21*a* to 24*a*: . . . power transmitting unit,
21*b* to 22*b*: . . . power transmitting unit,
26: . . . second power transmitter coil,
30: . . . first power receiving device,
31-34: . . . power receiving unit,
40: . . . second power receiving device,
41-44: . . . power receiving unit,
50: . . . first load device,
51: . . . second load device,
60: . . . first load detector circuit,
61: . . . second load detector circuit,
70: . . . control device,
210: . . . inverter,
211: . . . first switch,
212: . . . second switch,
213: . . . first power transmitter coil,
214: . . . second power transmitter coil,
220: . . . inverter,
221: . . . third switch,
222: . . . fourth switch,
223: . . . third power transmitter coil,
224: . . . fourth power transmitter coil,
310: . . . first power receiver coil,
311: . . . first rectifier circuit,
320: . . . third power receiver coil,
321: . . . third rectifier circuit,
410: . . . second power receiver coil,
411: . . . second rectifier circuit,
420: . . . fourth power receiver coil,
421: . . . fourth rectifier circuit

The invention claimed is:

1. A wireless power supply system for elevators that supplies power in a non-contact manner to a first elevator car and a second elevator car installed individually in two hoistways provided side by side, the wireless power supply system comprising:

a power transmitting device to supply power;

a first power receiving device provided in the first elevator car, to receive power supplied from the power transmitting device and supply the power to a first load device;

a second power receiving device provided in the second elevator car, to receive power supplied from the power transmitting device and supply the power to a second load device; and a control device to control at least one of the power transmitting device, the first power receiving device, and the second power receiving device, wherein the power transmitting device includes power transmitting units each of which has an inverter that supplies AC power and two power transmitter coils connected in parallel to each other to the inverter, the first power receiving device includes first power receiving units each of which has a power receiver coil that can be coupled with one of the two power transmitter coils and a rectifier circuit connected in series with the power receiver coil, the second power receiving device includes second power receiving units each of which has a power receiver coil that can be coupled with the other of the two power transmitter coils and a rectifier circuit connected in series with the power receiver coil, the power transmitting device, or the first power receiving device and the second power receiving device include a plurality of switches to disconnect the inverter and the first load device as well as the inverter and the second load device, the power transmitting units included in the power transmitting device are connected in parallel to each other, the first power receiving units are connected in parallel to each other, and the second power receiving units are connected in parallel to each other.

2. The wireless power supply system for elevators according to claim 1, further comprising:

a first load detector circuit to detect a state of the first load device; and a second load detector circuit to detect a state of the second load device, wherein the control device determines whether the first power receiving device stops at a position where power transfer with the power transmitting device is possible, determines the necessity of power supply to the first load device and the second load device on a basis of the determination result about the stopping position, the detection result of the first load detector circuit, and the detection result of the second load detector circuit, and controls on/off of a switch on a basis of the determined necessity of the power supply.

3. The wireless power supply system for elevators according to claim 1, further comprising:

a first load detector circuit to detect a state of the first load device; and a second load detector circuit to detect a state of the second load device, wherein the control device determines an amount of power supply to at least one of the first load device and the second load device on a basis of the detection result of at least one of the first load detector circuit and the second load detector circuit, and selects at least one power transmitting unit and at least one power receiving unit to operate from among the plurality of power transmitting units and the plurality of power receiving units on a basis of the determined amount of power supply.

4. The wireless power supply system for elevators according to claim 3, wherein at least one of the plurality of power transmitting units is different from another of the power transmitting units in supply power where the efficiency is maximized, and the control device selects a power transmitting unit to operate from among the plurality of power transmitting units as well as the plurality of first and second power receiving units on a basis of the determined amount of power supply.

5. The wireless power supply system for elevators according to claim 2, wherein the control device operates at least one of the inverters, calculates an impedance of the first load device side when viewed from the at least one of the inverters, and determines whether the first power receiving device stops at a position where power transfer with the power transmitting device is possible on a basis of the calculated impedance.

6. The wireless power supply system for elevators according to claim 3, wherein the control device operates at least one of the inverters, calculates an impedance of the first load device side when viewed from the at least one of the inverters, and determines whether the first power receiving device stops at a position where power transfer with the power transmitting device is possible on a basis of the calculated impedance.

7. The wireless power supply system for elevators according to claim 2, wherein the first load device and the second load device are batteries, the first load detector circuit and the second load detector circuit detect remaining battery levels of the first load device and the second load device, respectively, and the control device adjusts, on a basis of the detection results of the first load detector circuit and the second load detector circuit, the output power of the inverter up to a predetermined threshold at which no overvoltage occurs in the first load device and the second load device.

8. The wireless power supply system for elevators according to claim 3, wherein the first load device and the second load device are batteries, the first load detector circuit and the second load detector circuit detect remaining battery levels of the first load device and the second load device, respectively, and the control device adjusts, on a basis of the detection results of the first load detector circuit and the second load detector circuit, the output power of the inverter up to a predetermined threshold at which no overvoltage occurs in the first load device and the second load device.

9. The wireless power supply system for elevators according to claim 2, wherein the first load device and the second load device are batteries, and when the control device determines, on a basis of the detection result of at least one of the first load detector circuit and the second load detector circuit, that charging of the first load device or the second load device is completed, the control device turns off a switch that disconnects a path to the load device whose charging is completed.

10. The wireless power supply system for elevators according to claim 3, wherein the first load device and the second load device are batteries, and when the control device determines, on a basis of the detection result of at least one of the first load detector circuit and the second load detector circuit, that charging of the first load device or the second load device is completed, the control device turns off a switch that disconnects a path to the load device whose charging is completed.

11. The wireless power supply system for elevators according to claim 1, wherein the control device determines to supply power to one of the first load device and the second load device with priority over the other, turns on a switch corresponding to the one of the first load device and the second load device with priority and turns off a switch corresponding to the other load device, and after the power supply to the one of the first load device and the second load device with priority is completed, turns on the switch corresponding to the other load device.

12. The wireless power supply system for elevators according to claim 2, wherein
the control device
determines to supply power to one of the first load device and the second load device with priority over the other,
turns on a switch corresponding to the one of the first load device and the second load device with priority and turns off a switch corresponding to the other load device, and
after the power supply to the one of the first load device and the second load device with priority is completed, turns on the switch corresponding to the other load device.

13. The wireless power supply system for elevators according to claim 3, wherein
the control device
determines to supply power to one of the first load device and the second load device with priority over the other,
turns on a switch corresponding to the one of the first load device and the second load device with priority and turns off a switch corresponding to the other load device, and
after the power supply to the one of the first load device and the second load device with priority is completed, turns on the switch corresponding to the other load device.

14. The wireless power supply system for elevators according to claim 1, wherein
the control device
determines to supply power to one of the first load device and the second load device with priority over the other, and
sets the number of power transmitting units as well as the number of first or second power receiving units to operate to supply power to the one of the first load device and the second load device with priority larger than the number of power transmitting units as well as the number of second or first power receiving units to operate to supply power to the other load device, respectively.

15. The wireless power supply system for elevators according to claim 2, wherein
the control device
determines to supply power to one of the first load device and the second load device with priority over the other, and
sets the number of power transmitting units as well as the number of first or second power receiving units to operate to supply power to the one of the first load device and the second load device with priority larger than the number of power transmitting units as well as the number of second or first power receiving units to operate to supply power to the other load device, respectively.

16. The wireless power supply system for elevators according to claim 3, wherein
the control device
determines to supply power to one of the first load device and the second load device with priority over the other, and
sets the number of power transmitting units as well as the number of first or second power receiving units to operate to supply power to the one of the first load device and the second load device with priority larger than the number of power transmitting units as well as the number of second or first power receiving units to operate to supply power to the other load device, respectively.

17. The wireless power supply system for elevators according to claim 1, wherein
the wireless power supply system comprises a plurality of the power transmitting devices, and
the number of power transmitting units included in at least one of the power transmitting devices is different from the number of power transmitting units included in another of the power transmitting devices.

18. The wireless power supply system for elevators according to claim 2, wherein
the wireless power supply system comprises a plurality of the power transmitting devices, and
the number of power transmitting units included in at least one of the power transmitting devices is different from the number of power transmitting units included in another of the power transmitting devices.

19. An elevator system comprising:
the wireless power supply system for elevators according to claim 1;
a first hoistway;
a second hoistway provided side by side with the first hoistway;
a first elevator car to move in the first hoistway; and
a second elevator car to move in the second hoistway.

20. An elevator system comprising:
the wireless power supply system for elevators according to claim 2;
a first hoistway;
a second hoistway provided side by side with the first hoistway;
a first elevator car to move in the first hoistway; and
a second elevator car to move in the second hoistway.

* * * * *